United States Patent
Kenzi et al.

(10) Patent No.: US 6,213,406 B1
(45) Date of Patent: Apr. 10, 2001

(54) AUTOMOTIVE EVAPORATION COMBUSTION HEATER

(75) Inventors: Okada Kenzi; Takasawa Koozi; Huzinuma Tooru; Saito Shin; Takami Katushi, all of Iwateken (JP)

(73) Assignee: Mikuniadec Corporation, Iwate-Ken (JP)

(*) Notice: Subject to any disclaimer, the term of this patent is extended or adjusted under 35 U.S.C. 154(b) by 0 days.

(21) Appl. No.: 09/207,469

(22) Filed: Dec. 8, 1998

(30) Foreign Application Priority Data

Dec. 9, 1997 (JP) .................................................. 9-356049

(51) Int. Cl.[7] .................................................. B60H 1/02
(52) U.S. Cl. .................................. 237/12.3 C; 126/110 C
(58) Field of Search ........................ 237/12.3 C, 12.3 R; 431/261, 329, 328; 126/110 C, 116 R

(56) References Cited

U.S. PATENT DOCUMENTS

| | | | |
|---|---|---|---|
| 4,976,463 | * 12/1990 | Soo ....................................... | 237/8 C |
| 5,632,443 | * 5/1997 | Quarrie ............................ | 237/12.3 C |
| 5,653,387 | * 8/1997 | Takayanagi et al. ............ | 237/12.3 C |
| 5,707,227 | * 1/1998 | Iangen et al. .......................... | 431/261 |
| 5,722,588 | * 3/1998 | Inoue et al. ...................... | 237/12.3 C |
| 5,738,506 | * 4/1998 | Mosig et al. ............................ | 431/90 |

\* cited by examiner

*Primary Examiner*—Harold Joyce
*Assistant Examiner*—Derek S. Boles
(74) *Attorney, Agent, or Firm*—Goodman & Teitelbaum, Esqs.

(57) ABSTRACT

It is sought to reduce combustion rise time at the start of driving, increase the combustion efficiency per unit heat exchanger volume and reduce the heater size.

A ring-like fuel evaporating medium 4 is provided on an end wall of a combustion chamber formed in a combustion cylinder 1. The end wall has a combustion air lead holes formed, for forming a vortex flow, in its portion surrounded by the fuel evaporating medium. Fuel is supplied to a space in the vicinity of an upper part of the fuel evaporating medium. A combustion gas passage is formed by proving a first combustion gas collecting zone downstream a second combustion chamber adjacent to the first combustion chamber. A second combustion gas collecting zone 10 is provided around the first and second combustion chambers. The first and second combustion gas collecting zones 9 and 10 are communicated with each other by a plurality of connecting pipes. Combustion gas is exhausted from the second gas collecting zone 10. A heated medium passage is formed around the first and second combustion chambers, the first combustion gas collecting zone 9, the plurality of connecting pipes 11 and the second combustion gas collecting zone 10.

11 Claims, 7 Drawing Sheets

AUTOMOTIVE EVAPORATION COMBUSTION HEATER

BACKGROUND OF THE INVENTION

1. Field of the Invention

The present invention relates to automotive evaporation combustion heaters and, more particularly, to automotive evaporation combustion heaters for vehicles, which are suitable as automotive cooling water heaters and room heaters.

2. Prior Art

Heaters using liquid fuel are used as heat sources permitting the engine to start in short period of time in winter seasons or as auxiliary heat sources for room heating of running cars. Also, these heaters are used as room heaters of electric cars because of the demand for power consumption reduction of these cars due to battery capacity restrictions.

FIG. 9 shows a prior art automotive heater of the pertaining type. In this automotive evaporation combustion heater, fuel is supplied by a fuel pump (not shown) from a fuel tank via a fuel pipe 20 to the vicinity of an ignition plug 3. Space surrounding the ignition plug 3 is communicated with an outer pipe 30 forming a combustion chamber. Fuel flows from space surrounding the ignition plug 3 into the outer pipe 30. The outer pipe 30 has a fuel evaporating medium 4 applied to its inner surface. The fuel evaporating medium 4 is made of ceramic wool or the like, and has numerous inner pores communicated with one another. Liquid fuel is retained in the fuel evaporating medium 4 by the capillary phenomenon.

In the outer pipe 30, an inner pipe 31 is coaxially disposed. Air for combustion is supplied by the air supply blower 16 into the inner pipe 31. A flame-retaining plate 32 is secured to an end of the inner pipe 31. A gap is formed between the end of the inner pipe 31 and the flame-retaining plate 32. The inner pipe 31 also has a number of axial slits. The outer and inner pipes 30 and 31 forms an annular combustion chamber between them. In this combustion chamber, fuel evaporated from the fuel evaporating medium 4 and air issued through the gap between the inner pipe 31 and the flame-retaining plate 32 and also through the slits of the inner pipe 31 are mixed and combusted.

Fuel is ignited by the ignition plug 3. The ignition plug 3 has a helical heat-generating element. When the heat-generating element is energized for a fixed period of time, it is heated hot to a high temperature and ignites vapor fuel evaporated from the liquid fuel.

The flame-retaining plate 32 also serves as a baffle plate for the annular combustion chamber, and promotes complete combustion of fuel. Furthermore, the flame-retaining plate 32 functions to prevent extinguishment of flame. Combustion gas is led from the combustion chamber through an orifice 29 therein, and flows as a combustion gas stream 33 from the inner side of the combustion cylinder 1 along the outer side of the combustion cylinder 1 to be exhausted through a combustion gas exhaust pipe 13.

Heat radiated from the combustion gas heats water circulated in the automotive evaporation combustion heater. The water is circulated by a pump between a heat exchanger (not shown) for generating hot air and the automotive evaporation combustion heater. Water pumped out for the pump is led through a cooling water lead pipe 14 and enters a space defined between an outer and an inner water guide pipes 34 and 35. The water entering the space is guided by a helical partitioning member 36 along the periphery of the inner water guide pipe 35, and is led out through a cooling water outlet pipe 15. The heat of the combustion gas heats water via the inner water guide pipe 35, and the heated water heats air in the heat exchanger. The heated air is supplied into and warms the car room.

A thermostat 37 and temperature fuses 38 are provided on the outer side of the automotive evaporation combustion heater, and are connected in series. In the event of abnormal heating of the automotive evaporation combustion heater due to such cause as idle heating, either of the thermostat 7 and temperature fuses 38 becomes non-conductive. When a controller detects this, it stops the fuel pump to interrupt fuel supply.

In the above prior art automotive evaporation combustion heater, however, the fuel evaporating medium 4 which is applied to the entire inner surface of the outer pipe 30, is voluminous. This means that long time is required from the ignition until steady combustion sets in with the heating by the fuel evaporating medium 4. Therefore, long rise time of combustion is required until the room warming effect is obtained.

Another problem in the prior art automotive evaporation combustion heater arises from the fact that usually only a single orifice 29 is provided. With the single orifice 29, the combustion cylinder 1 should have a large length for obtaining complete combustion of fuel. Besides, the heat exchanger for heating water transmits heat only from the outer surface of the inner water guide pipe 35. Therefore, the inner water guide pipe 35 should also have a large length for ensuring sufficient heat exchange effect. These requirements leads to a large heater size, imposing restriction on the heater installation place or dictating sacrifice in safety for determining the installation place when the heater is installed in the narrow engine room.

The present invention was made in view of the above problems, and it has an object of providing an automotive evaporation combustion heater, which permits reducing the rise time from the ignition till the rising of combustion provides the steady state of combustion.

Another object of the present invention is to provide an automative evaporation combustion heater, which is small in size and permits increasing the heat exchange efficiency.

SUMMARY OF THE INVENTION

The automotive evaporation combustion heater according to the present invention features that it comprises a combustion chamber and a ring-like fuel evaporating medium provided on an end wall of the combustion chamber, the end wall having a combustion air lead holes formed, for forming a vortex flow, in a portion surrounded by the fuel evaporating medium, fuel being supplied to a space in the vicinity of an upper part of the fuel evaporating medium.

Another feature of the automotive evaporation combustion heater according to the present invention resides in that the peripheral wall of the combustion chamber has combustion air lead holes for forming a vortex flow parallel to and in the proximity of the fuel evaporating medium.

The automotive evaporation combustion heater according to the present invention further features that it comprises a heat exchanger disposed downstream a first combustion chamber, for causing heat exchange between combustion gas and a heated medium, the heat exchanger including a second combustion chamber adjacent to and downstream the combustion gas outlet side of the first combustion chamber, a first combustion gas collecting zone provided downstream the second combustion chamber, a second combustion gas collecting zone provided around the first and second combustion chambers, and a plurality of connecting pipes communicating the first and second combustion gas collecting zones with each other, combustion gas being exhausted from the second combustion gas collecting zone, a heated medium passage being formed around the first and second combustion chambers, the first combustion gas collecting zone, the plurality of connecting pipes and the second combustion gas collecting zone.

A further feature of the present invention resides in that it has an integral structure obtained by securing a flange to a casing covering the first combustion chamber and also to the heat exchanger, the flange being contacted by outlet side hot water and also outlet side combustion gas.

A still further feature of the present invention resides in that it comprises a hot water temperature sensor thermistor provided on a portion of the flange in contact with outlet side hot water, and a temperature fuse provided on a portion of the flange in contact with outlet side combustion gas, the hot water temperature sensor thermistor and the temperature fuse being wired by lead lines inside the casing.

A yet further feature of the present invention resides in that the second combustion chamber accommodates a plurality of eccentric orifice members disposed one downstream another.

A yet another feature of the present invention resides in that the connecting pipes each have a combustion gas guide provided as an inlet side extension.

A further feature of the present invention resides in that the connecting pipes each have an orifice provided at the outlet end.

The automotive evaporation combustion heater according to the present invention still further features that it comprises a combustion chamber, a ring-like fuel evaporating medium provided on an end wall of the combustion chamber and a heat exchanger, disposed downstream a first combustion chamber, for causing heat exchange between combustion gas and a heated medium, the end wall having a combustion air lead holes formed, for forming a vortex flow, in a portion surrounded by the fuel evaporating medium, a peripheral wall of the combustion chamber having combustion air lead holes for forming as vortex flow parallel to and in the proximity of the fuel evaporating medium, fuel being supplied to a space in the vicinity of an upper part of the fuel evaporating medium, the heat exchanger including a second combustion chamber adjacent to and downstream the combustion gas outlet side of the first combustion chamber, a first combustion gas collecting zone provided downstream the second combustion chamber, a second combustion gas collecting zone provided around the first and second combustion chambers, and a plurality of connecting pipes communicating the first and second combustion gas collecting zones with each other, combustion gas by exhausted from the second combustion gas collecting zone, a heated medium passage being formed around the first and second combustion chambers, the first combustion gas collecting zone, the plurality of connecting pipes and the second combustion gas collecting zone.

DETAILED DESCRIPTION OF THE PREFERRED EMBODIMENTS

Figure 1:
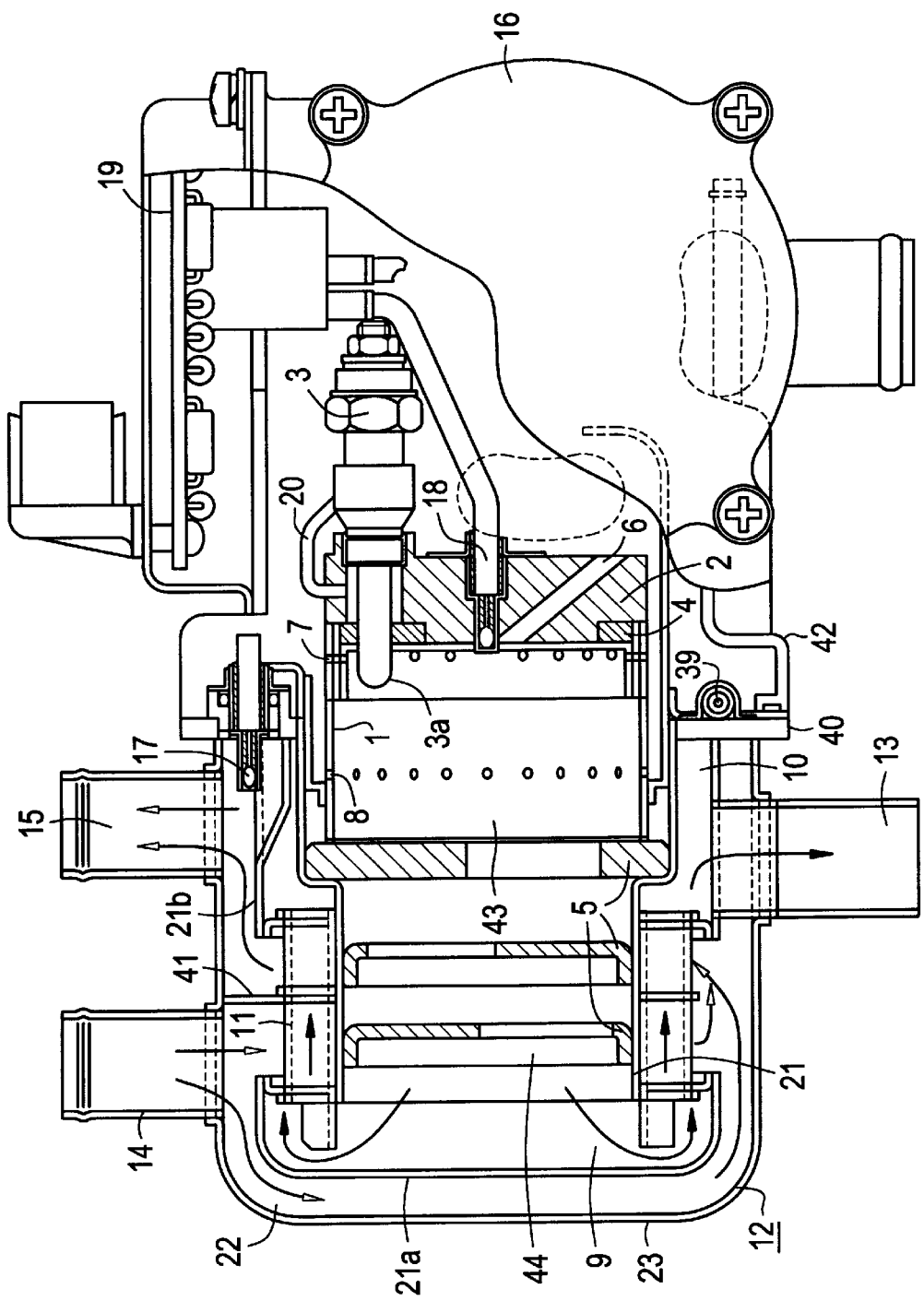
FIG. 1 is a sectional view showing an embodiment of the automotive evaporation combustion heater according to the present invention.
Figure 2A:
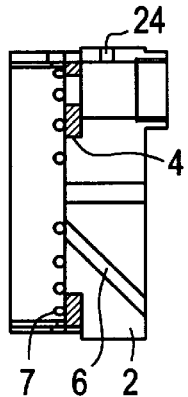
FIGS. 2(a) to 2(c) show part of the same automotive evaporation combustion heater, FIG. 2(a) being a sectional view, FIG. 2(b) being a left side view, FIG. 2(c) being a right side view.
Figure 2B:
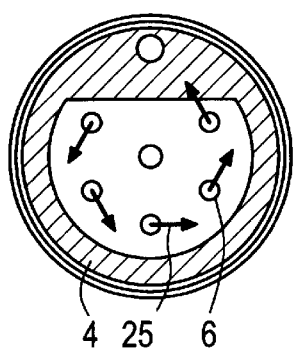
Figure 2C:
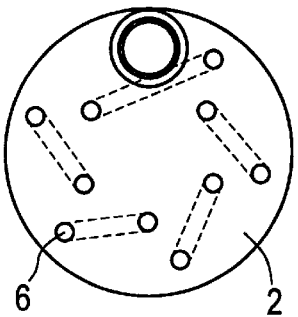

An embodiment of the automotive evaporation combustion heater according to the present invention will now be described with reference to the drawings. FIG. 1 is a sectional view showing the embodiment of the automotive evaporation combustion heater. FIG. 2(a) is a sectional view showing a part of the automotive evaporation combustion heater, FIG. 2(b) is a left side view showing the part shown in FIG. 2(a), and FIG. 2(c) is a right side view showing a part shown in FIG. 2(a). Fuel to be supplied to the automotive evaporation combustion heater is pumped out from a fuel tank by a fuel pump (not shown) and led via a fuel pipe 20 to a space around an ignition plug 3.

A combustion cylinder 1 supports a fuel evaporating medium support 2 secured to it. FIGS. 2(a) to 2(c) show the fuel evaporating medium support 2 in detail. As shown, the fuel evaporating medium support 2 has a central hole for inserting a combustion temperature sensor thermistor 18 (FIG. 1) therein and also has a hole formed in its upper portion, for inserting an ignition plug 3. The fuel evaporating medium support 2 supports a ring-like fuel evaporating medium 4 fitted in a recess formed in its front surface.

Figure 6:
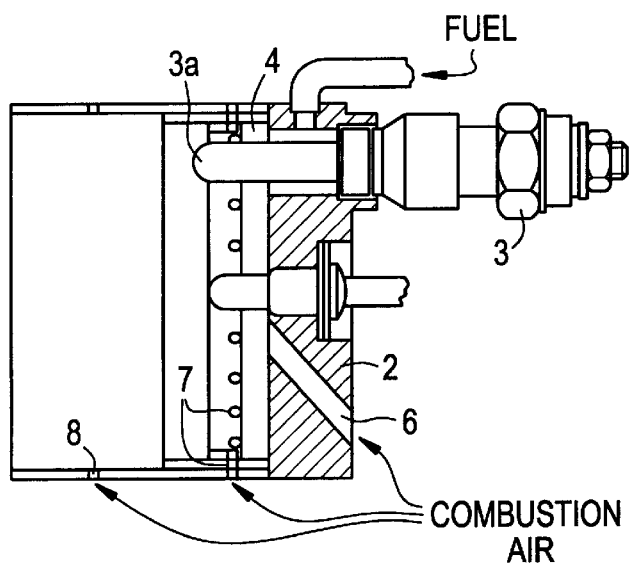
FIG. 6 is a sectional view showing part of the same automotive evaporation combustion heater.
Figure 7A:
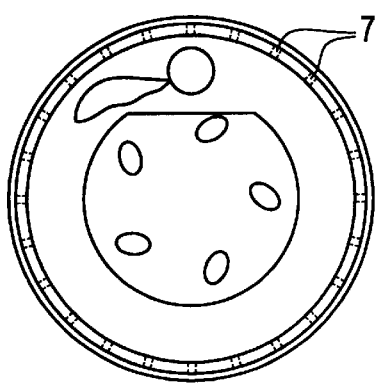
FIGS. 7(a) to 7(d) are views showing an ignition status viewed from the left side in FIG. 6.
Figure 7C:
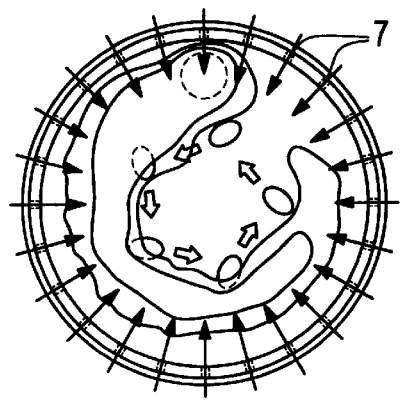
Figure 7B:
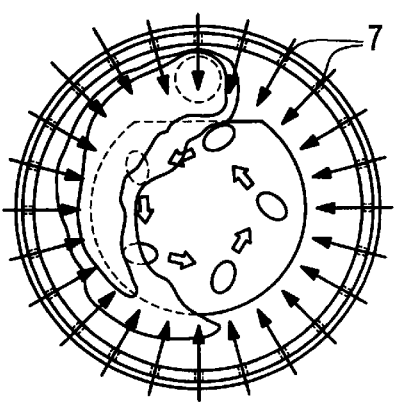
Figure 7D:
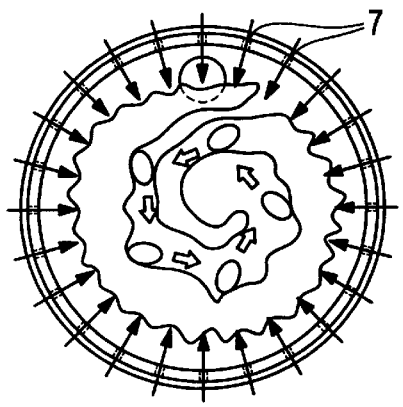

The ignition plug 3 has a heat-generating element 3a including a resistor, which generates heat when energized by a current and is covered by a cylindrical stainless steel cover. As shown in FIGS. 1 and 6, the heat-generating element 3a penetrates the hole in the fuel evaporating medium support 2 and also the fuel evaporating medium 4. The heat-generating element 3a is snugly fitted in the fuel evaporating medium 4, but a ring-like gap is defined between the heat-generating element 3a and the fuel evaporating medium support 2.

As shown in FIG. 2(a), to the gap is open a fuel feed port 24, through which fuel supplied through a fuel pipe 20 flows into the gap. The fuel evaporating medium 4 is a compressed mass of ceramic wool, and has numerous inner pores communicated with one another. Fuel flows through the hole in the fuel evaporating medium support 2 into a space corresponding to an upper portion of the fuel evaporating medium 4, and flows down along the fuel evaporating medium 4. The fuel evaporating medium 4 retains fuel in the liquid phase by the capillary phenomenon.

The fuel evaporating medium support 2 has six first air lead holes 6, which are twisted and extent obliquely. In FIG. 1 and the sectional view of FIG. 2(a), the full length Of the first air lead holes 6 is depicted to facilitate the understanding. The combustion cylinder 1 has a plurality of second air lead holes 7 formed at a uniform interval along a peripheral wall portion near the surface of the fuel evaporating medium 4, and also has a plurality of tertiary air lead holes 8 formed at a uniform interval along a central peripheral wall portion. Air blower 16 supplies air such as to be issued through the first to tertiary air lead holes 6 to 8.

Air issued through the first air lead holes 6 forms a vortex flow 25 as shown by arrows in FIG. 2(b). Fuel evaporated from the fuel evaporating medium and air issued through the first air lead holes 6 bring about initial combustion. A controller 19 which is disposed above the air blower 16 controls the combustion. More specifically, the controller 19 receives car operation signals, a signal from a hot water temperature sensor thermistor 17 and a signal from a combustion temperature sensor thermistor 18, and controls the fuel pump, the air blower 16 and the ignition plug 3.

The ignition plug 3 ignites fuel. More specifically, when the resistor of the ignition plug 3 is energized for a predetermined period of time, the heat-generating element 3a is red heated to a high temperature. Subsequently, liquid fuel is supplied from a fuel pump to the neighborhood of the ignition plug and permeates the fuel evaporating medium 4. At the same time, air blower 16 supplies air for combustion. Fuel around the ignition plug 3 is evaporated and ignited by the red hot heat-generating element 3a.

FIG. 6 shows fuel and combustion air supply paths in detail. FIGS. 7(a) to 7(d) show how fuel is ignited. As shown in FIGS. 7(a) to 7(d), flame generated by the ignition plug 3 is spirally spread to cover the entire surface of the fuel evaporating medium 4. The flame increases fuel, which is evaporated from the surface of the fuel evaporating medium 4 and combusted. The amounts of fuel and combustion air supplied are increased to meet the combustion extent increase. Since the fuel evaporating medium 4 is ring-like in form, its volume is small, and it retains little liquid fuel. Thus, fuel is quickly evaporated, and the combustion rise time can be reduced.

As shown in FIGS. 7(a) to 7(d), air supplied through the second air lead holes 7 flows along the surface of the fuel evaporating medium 4, and prevents deposition of carbon on the surface of the fuel evaporating medium 4, while causing combustion of evaporated fuel. Mixture of the combustion gas and evaporated fuel further flows through the combustion cylinder 1 shown in FIG. 1 to the left, and mixed with air issued through the tertiary air lead holes 8 to continue the combustion.

In the steady state of combustion, the controller 19 controls the operations of the fuel pump and the air blower 16 according to car operation signals and the signals form the hot water temperature sensor thermistor 17 and the combustion temperature sensor thermistor 18.

The combustion gas that is generated in a first combustion chamber 43 in the combustion cylinder 1 heats cooling water in a heat exchanger 12, which is constituted by an inner pipe 21, a combustion gas collector 21a, connecting pipes 11, a combustion gas collection cylinder 21b and an outer cyinder 23. In the inner pipe 21, three eccentric orifice members 21 are disposed, which disturb the gas stream in the second combustion chamber 44 in the inner pipe 21,and cause complete combustion of non-combusted fuel in a short distance zone.

The combustion gas in the inner pipe 21 is collected in a first combustion gas collection zone 9 defined by the combustion gas collector 21a, then flows through the connecting pipes 11 into a second combustion gas collection zone 10 defined by the combustion gas collection cylinder 21b, and is then exhausted from a combustion gas exhaust pipe 13 leading from the combustion gas collection cylinder 21b. In FIG. 1, the flow of combustion gas is shown by a black arrow.

Cooling water enters the outer cylinder 23 through a cooling water inlet pipe 14 provided on the top of the outer cylinder 23, and is exhausted through a cooling water outlet pipe 15 also provided on the top of the outer cylinder 23. In the outer cylinder 23, a partitioning wall 41 having a gap in its lower part is provided between the cooling water inlet and outlet pipes 14 and 15. With the provision of the partitioning wall 41, cooling water entering the outer cylinder 23 from the cooling water inlet pipe 14 flows around all the members defining combustion gas streams before being exhausted form the cooling water outlet pipe 1. The partitioning wall 41 has a small notch formed at the upper end. Air which enter the outer cylinder 23 from the cooling water inlet pipe 14, thus can pass through the notch and be exhausted from the cooling water outlet pipe 15. In FIG. 1, the flow of cooling water is shown by white arrows.

Figure 3:
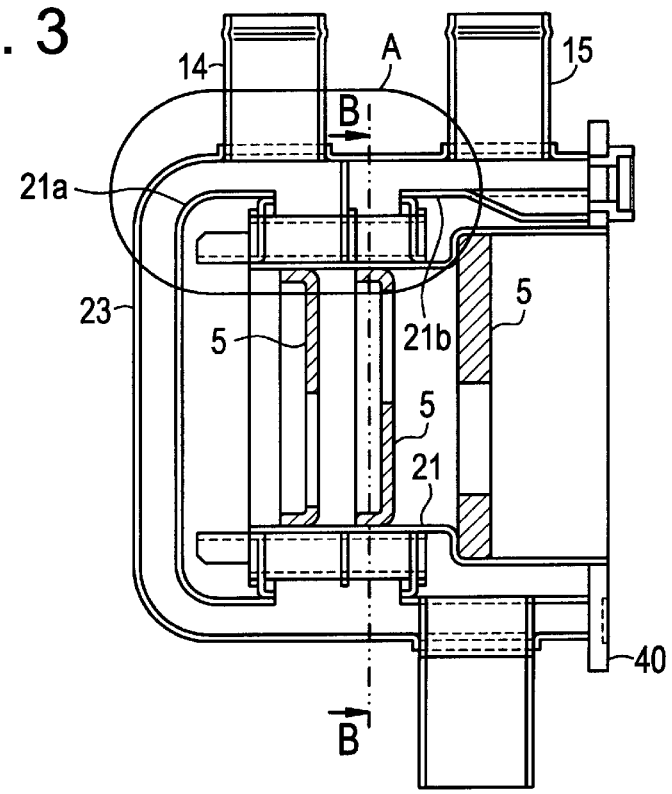
FIG. 3 is a sectional view showing the same automotive evaporation combustion heater.
Figure 4:
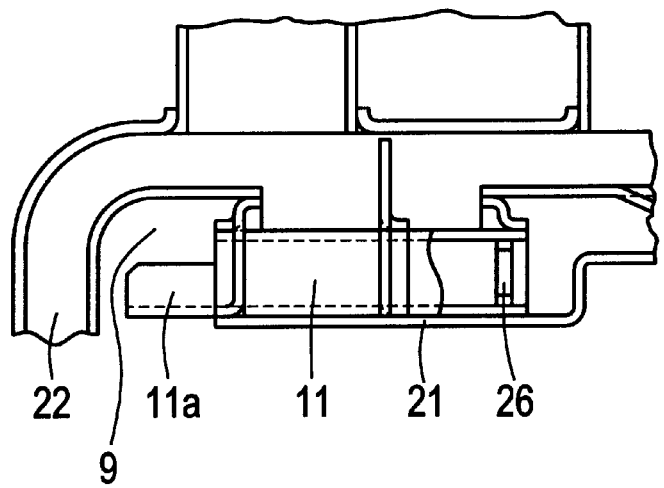
FIG. 4 is a sectional view showing part A in FIG. 3.
Figure 5:
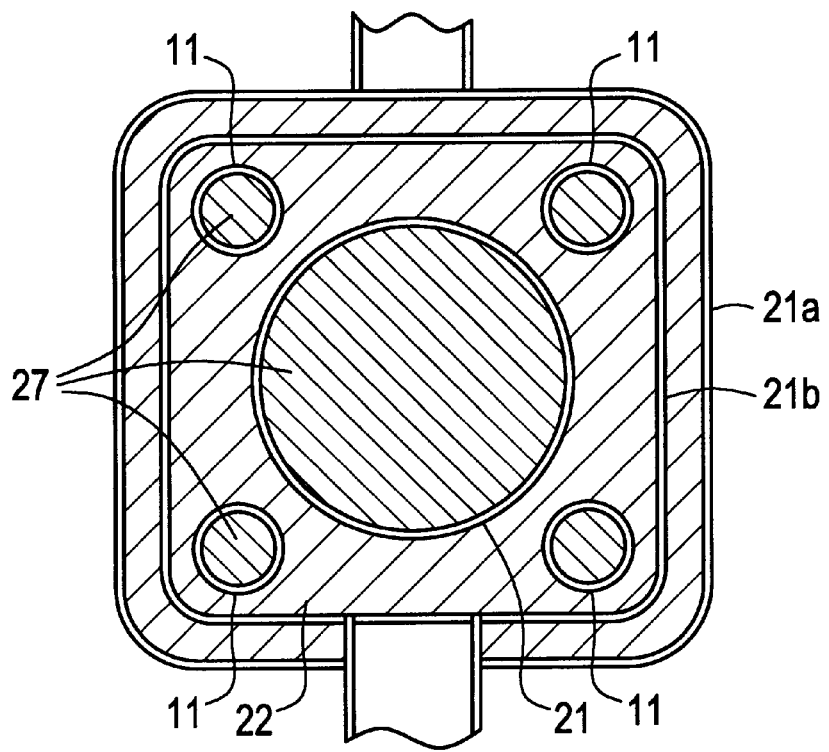
FIG. 5 is a sectional view taken along line B—B in FIG. 3.
Figure 9A:
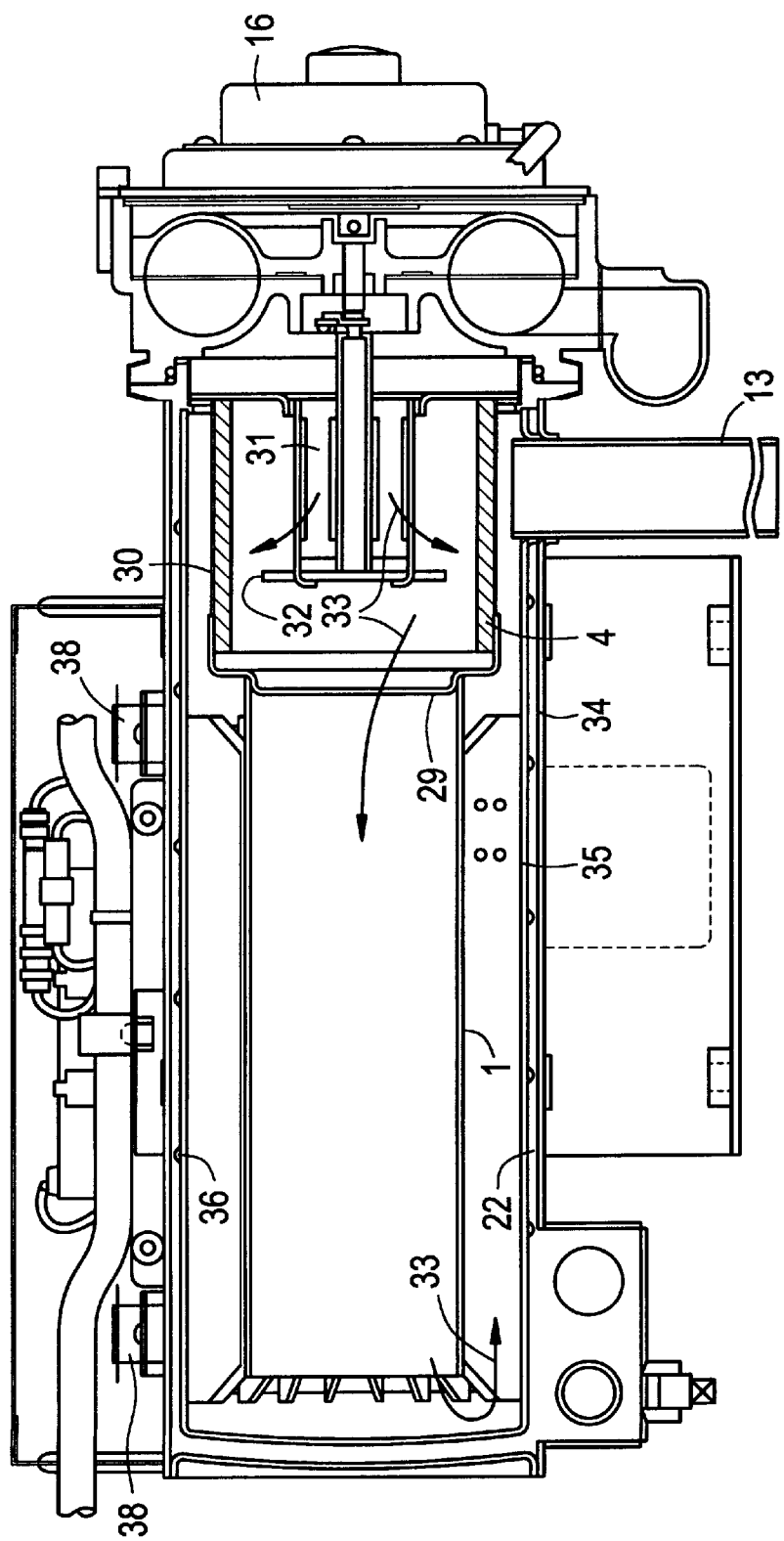
FIGS. 9(a) to 9(c) show a prior art automotive evaporation combustion heater, FIG. 9(a) being a sectional view, FIG. 9(b) being a side view, FIG. 9(c) a sectional view taken along line C—C in FIG. 9(b).
Figure 9B:
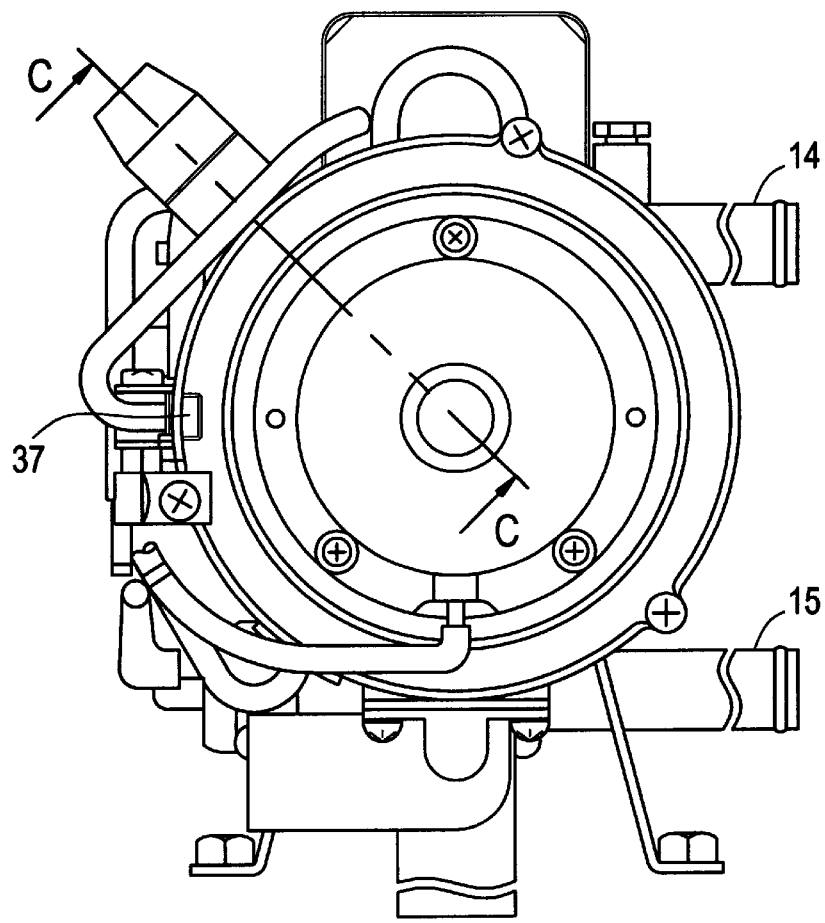
Figure 9C:
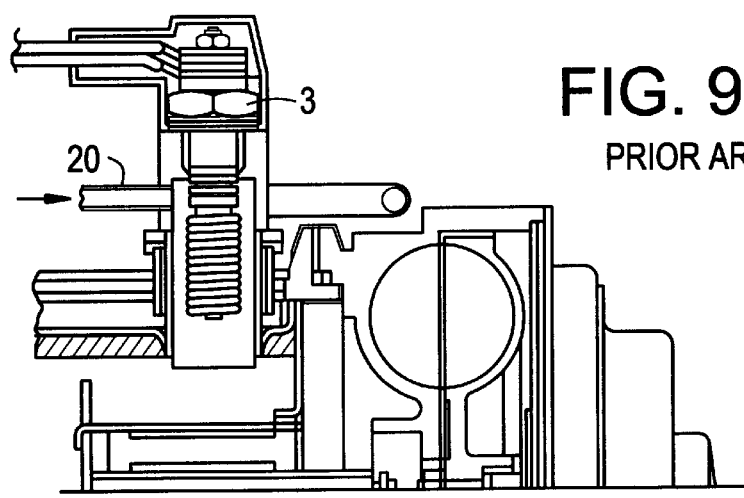

FIGS. 3 to 5 show the heat exchanger 12 in detail. FIG. 3, like FIG. 1, shows the heat exchanger 12 in a sectional view. As shown, the automotive evaporation combustion heater has an integral structure such that a flange 40 is secured to the outer cylinder 23 of the heat exchanger 12 and also to a casing 42 as shown in FIG. 1. This means that the heat exchanger 12 and the part covered by the casing 42 can be assembled separately. The temperature sensor thermistor 17 is disposed on the inner side of the flange 40 and near the hot water outlet. A temperature fuse 39 is disposed on the outer side of the flange 40 and at as position corresponding to the combustion gas outlet. The temperature sensor thermistor 17 and the temperature fuse 39 are wired by lead lines laid inside the casing 42. In the prior art heater shown in FIG. 9, the temperature fuses 38 and the thermostat 37 are mounted on the outer side of the heat exchanger, and therefore they require covers for their lead line protection and water tightness, thus increasing the outer size and cost. The above structure according to the present invention obviates the above problems.

As shown in detail in FIG. 4, each connecting pipe 11 has a combustion gas guide 11a, which is a semi-cylindrical part facing the center of the inner pipe 21 and extending into the first combustion gas collecting zone 9. The connecting pipe 11 has an orifice 26 provided at its outlet end. With the provision of the combustion gas guides 11a, the combustion gas from the inner pipe 21 to the connecting pipes 11 flows along a bipassing route through the combustion gas guides 11a, so that a vortex flow of combustion gas is formed in the entire first combustion gas collecting zone 9. The orifices 26 muffle combustion noise.

Referring to FIG. 5, shown densely shaded is a combustion gas passage 27, enclosed by the inner pipe 21 and the connecting pipes 11 and surrounded by a cooling water passage 22 as shown coarsely shaded. This arrangement permits increasing the heat exchange surface per unit length in the longitudinal direction of the heater. In addition, since fuel is completely combusted in the short inner pipe 21 as described before, it is possible to reduce the size of the heat exchanger. Water that is heated in the heat exchanger is used as engine cooling water, but it also heats air in another heat exchanger (not shown). The heated air is supplied into the car room for warming thereof.

Figure 8:
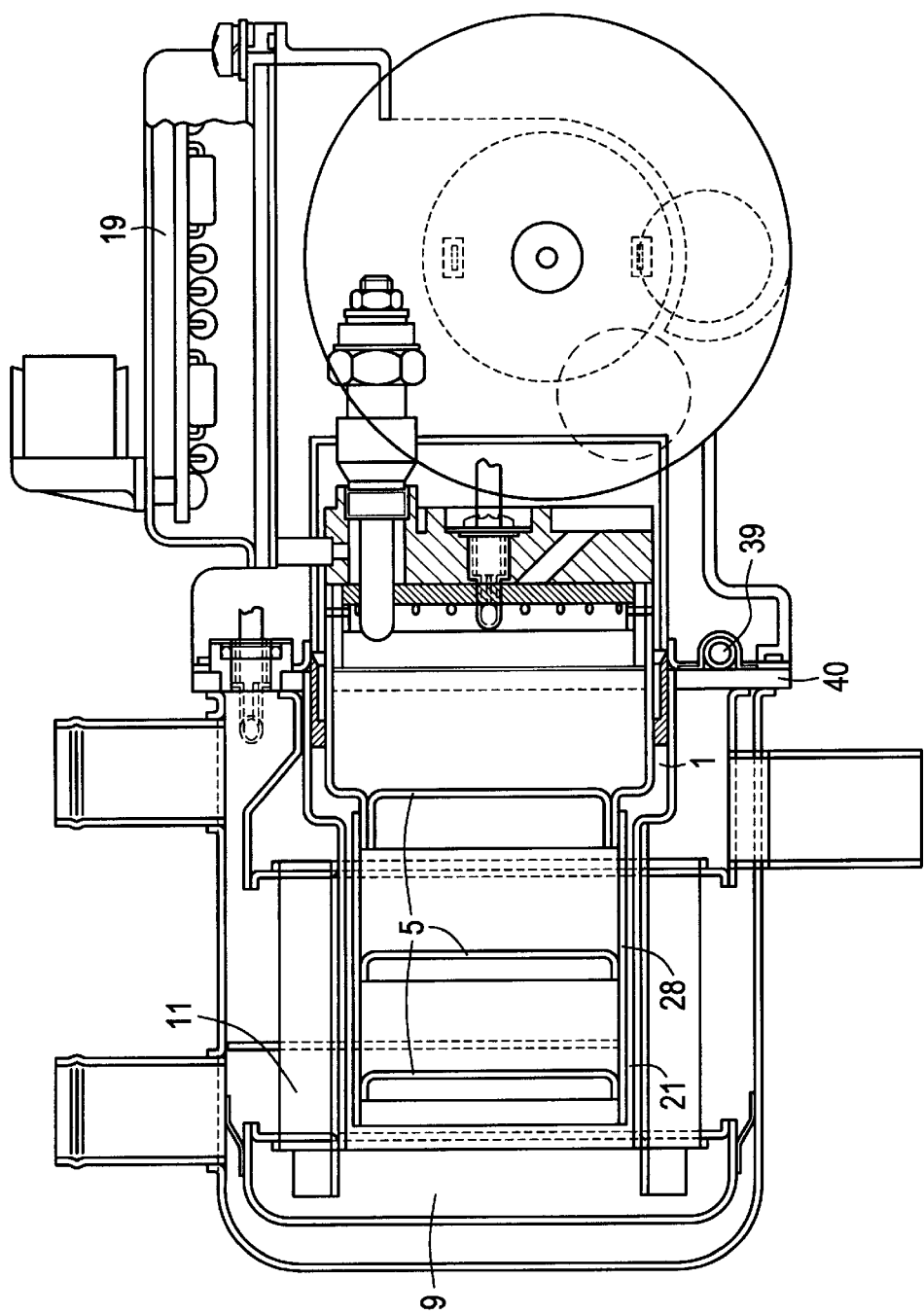
FIG. 8 is a sectional view showing a different embodiment of the automotive evaporation combustion heater according to the prevent invention.

FIG. 8 shows a different embodiment of the present invention. In this embodiment of the automotive evaporation combustion heater, a rear combustion cylinder 28 is disposed in an inner pipe 21, and accommodates three eccentric orifice members 5. Combustion gas in the combustion cylinder 1 is led to the rear combustion cylinder 28, and thence to a first combustion gas collecting zone 9. For the remainder, this embodiment has the same construction as the heater shown in FIG. 1. A temperature fuse 39 which is mounted on the heat exchanger, is connected to a controller 19. When the heat exchanger is excessively heated, the temperature fuse 39 is broken to interrupt the fuel supply. In this embodiment, the combustion chamber and the cooling water passage are partitioned from each other by a double-wall partitioning member.

As has been described in the foregoing, the automotive evaporation combustion heater according to the present invention permits reducing the combustion rise time at the start of driving. In addition, the heater permits improving the heat exchange efficiency per unit volume of the heat exchanger and reduce the heater size. Furthermore, the heater can reduce combustion noise.

What is claimed is:

1. An automotive evaporation combustion heater comprising:
   a combustion cylinder and a ring-like fuel evaporating medium provided on an end wall of the combustion cylinder,
   the end wall having combustion air lead holes for providing a vortex flow,
   the combustion air lead holes being provided in a portion surrounded by the fuel evaporating medium,
   a space being provided in a vicinity of an upper part of the fuel evaporating medium to receive fuel therein, and
   an ignition plug in substantial contact with the fuel evaporating medium to ignite the fuel.

2. The automotive evaporation combustion heater according to claim 1, wherein a peripheral wall of the combustion cylinder has combustion air lead holes for providing a vortex flow parallel to and in the proximity of the fuel evaporating medium.

3. An automotive evaporation combustion heater comprising:
   a heat exchanger disposed downstream from a first combustion chamber for causing heat exchange between combustion gas and a heated medium,
   the heat exchanger including a second combustion chamber adjacent to and downstream a combustion gas outlet side of the first combustion chamber,
   a first combustion gas collecting zone being provided downstream the second combustion chamber, a second combustion gas collecting zone being provided around the first and second combustion chambers, and a plurality of connecting pipes for communicating the first and second combustion gas collecting zones with each other, so that combustion gas is exhausted from the second combustion gas collecting zone,
   a heated medium passage being provided around the first and second combustion chambers, also around the first combustion gas collecting zone, also around the plurality of connecting pipes and also around the second combustion gas collecting zone,
   the first combustion chamber being disposed in a combustion cylinder, the combustion cylinder supporting a fuel evaporting medium, a space being provided adjacent to the fuel evaporating medium to receive fuel therein, and
   an ignition plug in substantial contact with the fuel evaporating medium to ignite the fuel.

4. The automotive evaporation combustion heater according to claim 3, wherein an integral structure includes a flange secured to a casing covering the first combustion chamber and also secured to the heat exchanger, the flange being contacted by outlet side hot water and also by outlet side combustion gas.

5. The automotive evaporation combustion heater according to claim 3, wherein the second combustion chamber accommodates a plurality of eccentric orifice members disposed one downstream another.

6. The automotive evaporation combustion heater according to claim 3, wherein the connecting pipes each have a combustion gas guide provided as an inlet side extension.

7. The automotive evaporation combustion heater according to claim 3, wherein the connecting pipes each have an orifice provided at an outlet end.

8. The automotive evaporation combustion heater according to claim 3, wherein an integral structure includes a flange secured to a casing covering the first combustion chamber and also secured to the heat exchanger.

9. The automotive evaporation combustion heater according to claim 8, wherein a hot water temperature sensor thermistor is provided on a first portion of the flange in conect with outlet side hot water, and a temperature fuse is provided on a second portion of the flange in contact with outlet side combustion gas, the hot water temperature sensor thermistor and the temperature fuse being wired by lead lines laid inside the casing.

10. An automotive evaporation combustion heater comprising:
    a heat exchanger disposed downstream a first combustion chamber for causing heat exchange between combustion gas and a heated medium,
    the heat exchanger including a second combustion chamber adjacent to and downstream a combustion gas outlet side of the first combustion chamber,
    a first combustion gas collecting zone being provided downstream the second combustion chamber, a second combustion gas collecting zone being provided around the first and second combustion chambers, and a plurality of connecting pipes for communicating the first and second combustion gas collecting zones with each other, so that combustion gas is exhausted from the second combustion gas collecting zone,
    a heated medium passage being provided around the first and second combustion chambers, also around the first combustion gas collecting zone, also around the plurality of connecting pipes and also around the second combustion gas collecting zone,
    an integral structure including a flange secured to a casing covering the first combustion chamber and also secured to the heat exchanger, the flange being contacted by outlet side hot water and also by outlet side combustion gas,
    a hot water temperature sensor thermistor being provided on a first portion of the flange in contact with the outlet side hot water, and a temperature fuse being provided on a second portion of the flange in contact with the outlet side combustion gas, the hot water temperature sensor thermistor and the temperature fuse being wired by lead lines laid inside the casing.

11. An automotive evaporation combustion heater comprising:
    a combustion cylinder, a ring-like fuel evaporating medium provided on an end wall of the combustion cylinder, and a heat exchanger disposed downstream from a first combustion chamber for causing heat exchange between combustion gas and heated medium, the end wall having first combustion air lead holes for providing a vortex flow, the combustion air lead holes being provided in a portion surrounded by the fuel evaporating medium, a peripheral wall of the combustion cylinder having second combustion air lead holes for providing a vortex flow parallel to and in proximity of the fuel evaporating medium, a space being provided in a vicinity of an upper part of the fuel evaporating medium to receive fuel therein, an ignition plug being in substantial contact with the fuel evaporating medium to ignite the fuel, the heat exchanger including a second combustion chamber adjacent to and downstream from a combustion gas outlet side of the first combustion chamber, a first combustion gas collecting zone being provided downstream from the second combustion chamber, a second combustion gas collecting zone being provided around the first and second combustion chambers, and a plurality of connecting pipes for communicating the first and second combustion gas collecting zones with each other, so that combustion gas is exhausted from the second combustion gas collecting zone, and a heated medium passage being provided around the first and second combustion chambers, also around the first combustion gas collecting zone, also around the plurality of connecting pipes and also around the second combustion gas collecting zone.

* * * * *